Feb. 16, 1971  J. L. JERNIGAN  3,564,461
PROCESS FOR MAKING AN ULTRASONIC DELAY CELL
Filed Nov. 4, 1968

INVENTOR.
JAMES L. JERNIGAN
BY
ROY MILLER
ATTORNEY.

United States Patent Office 3,564,461
Patented Feb. 16, 1971

3,564,461
PROCESS FOR MAKING AN ULTRASONIC DELAY CELL
James L. Jernigan, Inyokern, Calif., assignor to the United States of America as represented by the Secretary of the Navy
Filed Nov. 4, 1968, Ser. No. 772,989
Int. Cl. H03h 7/30, 9/00; H04b 9/00
U.S. Cl. 333—30
8 Claims

ABSTRACT OF THE DISCLOSURE

A process for making an ultrasonic delay cell wherein a quartz rod is notched at each end halfway along its optical path. First and second ultrasonic transducers are mounted at opposite ends of the rod so that one acoustic beam is behind the other in the optical path. Protective shields are inserted into the notches to prevent damage to the transducers as the portion of the end of the rod opposite each transducer is sandblasted to terminate each acoustic beam.

GOVERNMENT INTEREST

The invention described herein may be manufactured and used by or for the Government of the United States of America for governmental purposes without the payment of any royalties thereon or therefor.

BACKGROUND OF THE INVENTION

In many optical processing techniques it is desirable to have a delay cell which can accept two electrical inputs. Pat. No. 3,111,666 to R. M. Wilmotte discloses two delay cells used in tandem separated by polarizing filters and quarter-wave optical plates. This system was optically inefficient and difficult to align and set up.

Ultrasonic delay cells having transducers opposite each other are unsatisfactory in that the high insertion loss of the transducers reflect a considerable amount of energy thus producing a poor termination. If the transducers are offset, terminating material may be applied to the exposed ends of the cell opposite each transducer. Sandblasting techniques produce the best termination for some applications, however, difficulties in protecting the transducers are encountered when an attempt is made to sandblast the exposed portions of the ends of the cell.

SUMMARY OF THE INVENTION

In accordance with the present invention, a quartz rod is notched at each end halfway along its optical path. A first piezoelectric transducer is mounted to one side of the notch at one end of the rod. A second piezoelectric transducer is mounted to one side of the notch at the other end of the rod so that the acoustic beam of the second piezoelectric transducer is behind the beam of the first piezoelectric transducer along the optical path.

Protective shields are then inserted into the notches at the ends of the rod and the portions of the ends of the rod on one side of the shield and opposite each transducer are sandblasted to terminate each acoustic beam. The shields are then removed.

DESCRIPTION OF THE PREFERRED EMBODIMENTS

The choice of a suitable rod is important in the construction of an ultrasonic delay cell. The rod must be transparent to the wavelength of light of interest, sufficiently strong to support a pair of transducers and have good handling characteristics. One such material which is suitable for use as a rod is fuzed quartz.

Figure 1:
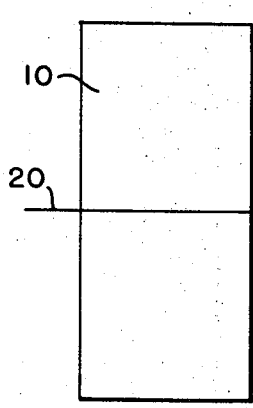
FIG. 1–FIG. 5 are diagrammatic views illustrating an embodiment of the invention.

FIG. 1 shows a fuzed quartz rod 10, having four sides, a top and a bottom. Incident light 20 enters the front of rod 10 and exits from the rear travelling along optical path Y. The rod is taller than it is wide, and wider than it is deep. All six sides are polished.

Figure 2:
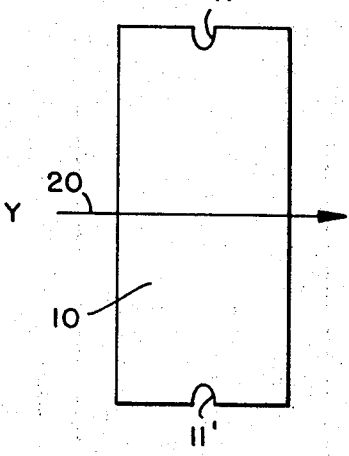

In FIG. 2, fuzed quartz rod 10 is shown with notches 11 and 11' cut into it. The notches are placed halfway along optical path Y.

Figure 3:
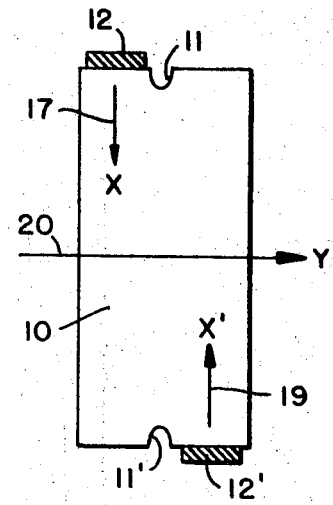

In FIG. 3, fuzed quartz rod 10 is shown with piezoelectric transducers 12 and 12' mounted so that acoustic beam 19 travelling in direction X' from transducer 12' is behind acoustic beam 17 travelling in direction X from transducer 12 in the optical path. Transducers 12 and 12' may be mounted using vapor deposition techniques.

Figure 4:
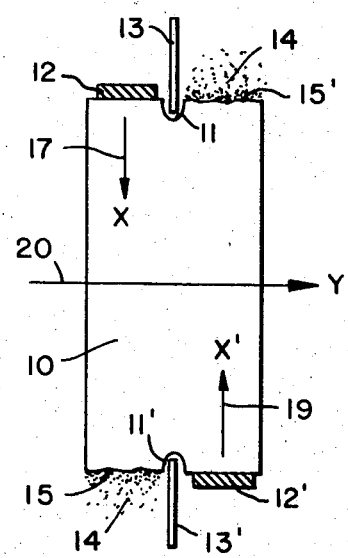

FIG. 4 shows baffles 13 and 13' inserted into notches 11 and 11' respectively. Baffles 13 and 13' may be made of any hard material available in sheet form such as aluminum. With the baffles in place, a fine grit 14, such as sand, is directed upon the top and bottom areas of quartz rod 10 opposite transducers 12' and 12 respectively. The sand blasting roughens the surface of rod 10 to provide acoustic termination for acoustic beams 17 and 19 at 15 and 15' respectively.

Piezoelectric transducers 12 and 12' must be placed on rod 10 prior to sandblasting to evaluate the bond of the transducer to the rod.

Figure 5:
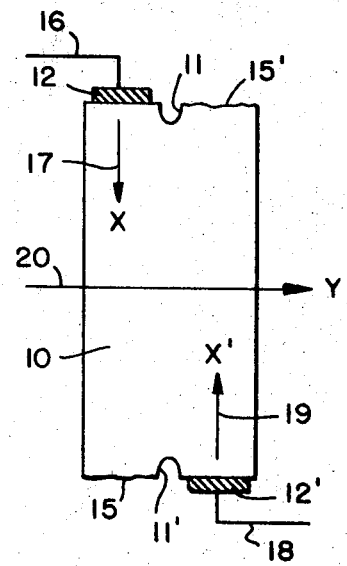

After sandblasting has taken place, baffles 13 and 13' are removed. As shown in FIG. 5, electrical leads 16 and 18 have been attached to transducers 12 and 12' respectively. Acoustic beam 17, travelling in direction X is responsive to the electrical signal in lead 16 and acoustic beam 19 travelling in direction X' is responsive to the electrical signal in lead 18.

What is claimed is:
1. A process for making an ultrasonic delay cell comprising the steps of:
   selecting a rod having,
      suitable handling characteristics,
      transparency to the wavelength of light of interest along an optical path through the rod, and
      acoustic excitation capability;
   placing two notches in the rod centered about a line halfway along the optical path through the rod,
      the first notch being placed at the top of the rod, and
      the second notch being placed at the bottom of the rod;
   mounting a first piezoelectric transducer on the top of the rod to one side of the line halfway along the optical path;
   mounting a second piezoelectric transducer on the bottom of the rod to the other side of the line halfway along the optical path;
   inserting a first baffle into the notch at the top of the rod to shield the first transducer;
   inserting a second baffle into the notch at the bottom of the rod to shield the second transducer;
   acoustically terminating the portion of the top of the rod on the other side of the shield from the first transducer;
   acoustically terminating the portion of the bottom of the rod on the other side of the shield from the second transducer.
2. The process of claim 1 wherein the rod selected is fuzed quartz.
3. The process of claim 2 wherein:
   the first and second transducers are mounted by vapor deposition.
4. The process of claim 3 wherein:

the acoustic termination of the ends of the rod is accomplished by sandblasting means.

5. An ultrasonic delay cell comprising:
a rod capable of acoustic excitation;
an optical path through said rod;
a first piezoelectric transducer mounted on the top of the rod to one side of a line drawn halfway along the optical path;
a first means for acoustic termination placed on the bottom of the rod opposite to and on the same side of the line drawn halfway along the optical path as the first piezoelectric transducer;
a second piezoelectric transducer mounted on the bottom of the rod to the other side of a line drawn halfway along the optical path;
a second means for acoustic termination placed on the top of the rod opposite to and on the same side of the line drawn halfway along the optical path as the second piezoelectric transducer.

6. The ultrasonic delay cell of claim 5 wherein the rod is made of fuzed quartz.

7. The ultrasonic delay cell of claim 6 wherein:

the first and second piezoelectric transducers are mounted by vapor deposition.

8. The ultrasonic delay cell of claim 7 wherein:
the means for acoustic termination is accomplished by sandblasting; and
the first and second piezoelectric transducers are protected from the sandblasting by shields inserted into notches cut into the top and bottom of the rod halfway along the optical path.

References Cited
UNITED STATES PATENTS 3,111,666  10/1963  Wilmotte _____ 343—13
3,330,956  7/1967  Wade _____ 250—199

ELI LIEBERMAN, Primary Examiner

M. NUSSBAUM, Assistant Examiner

U.S. Cl. X.R.

250—199